Jan. 20, 1948.  K. W. COUSE  2,434,791
SHIFTING MECHANISM FOR POWER TRANSMISSION APPARATUS
Filed Feb. 26, 1946  3 Sheets-Sheet 3
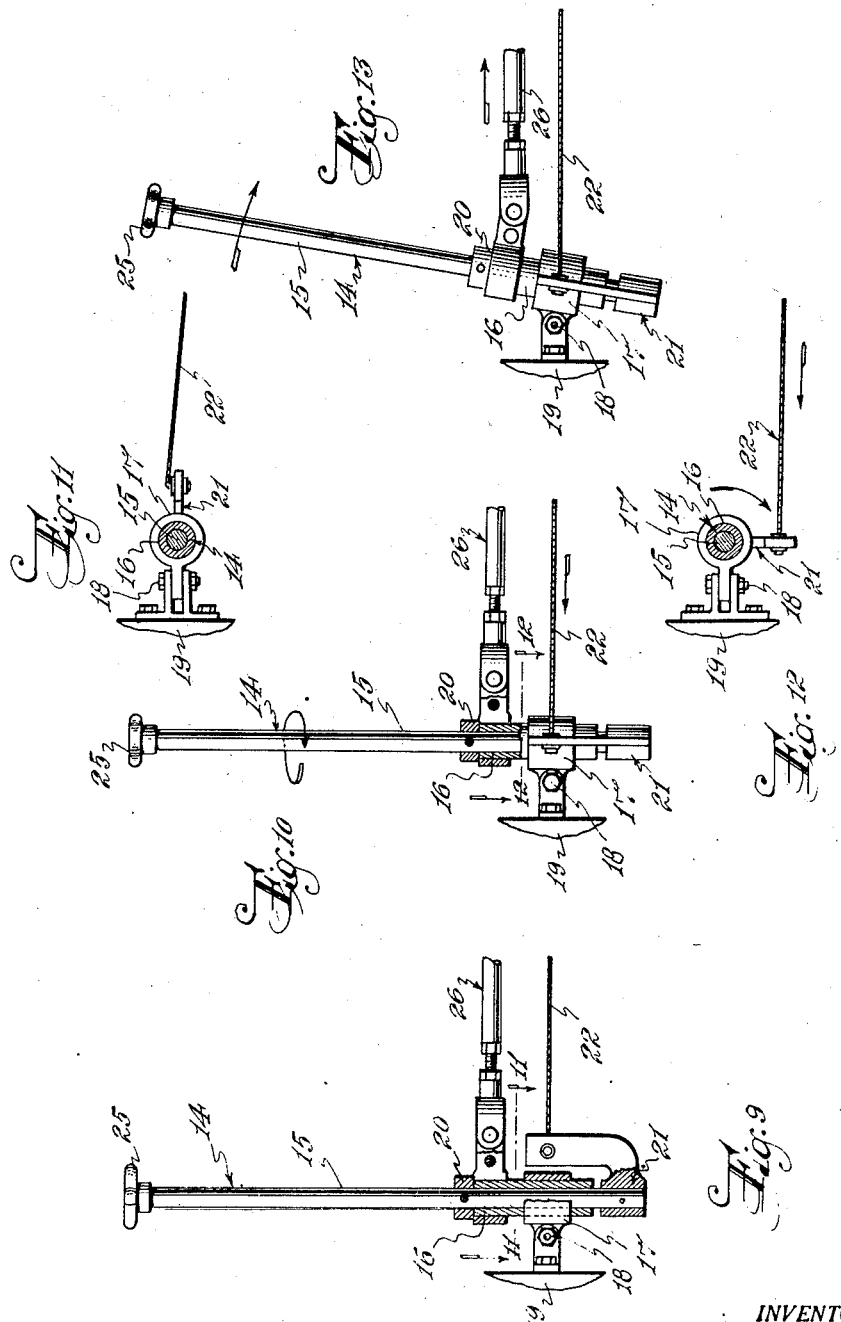
INVENTOR.
Kibbey W. Couse.
BY
*Harry V. Cook.*
ATTORNEY Patented Jan. 20, 1948

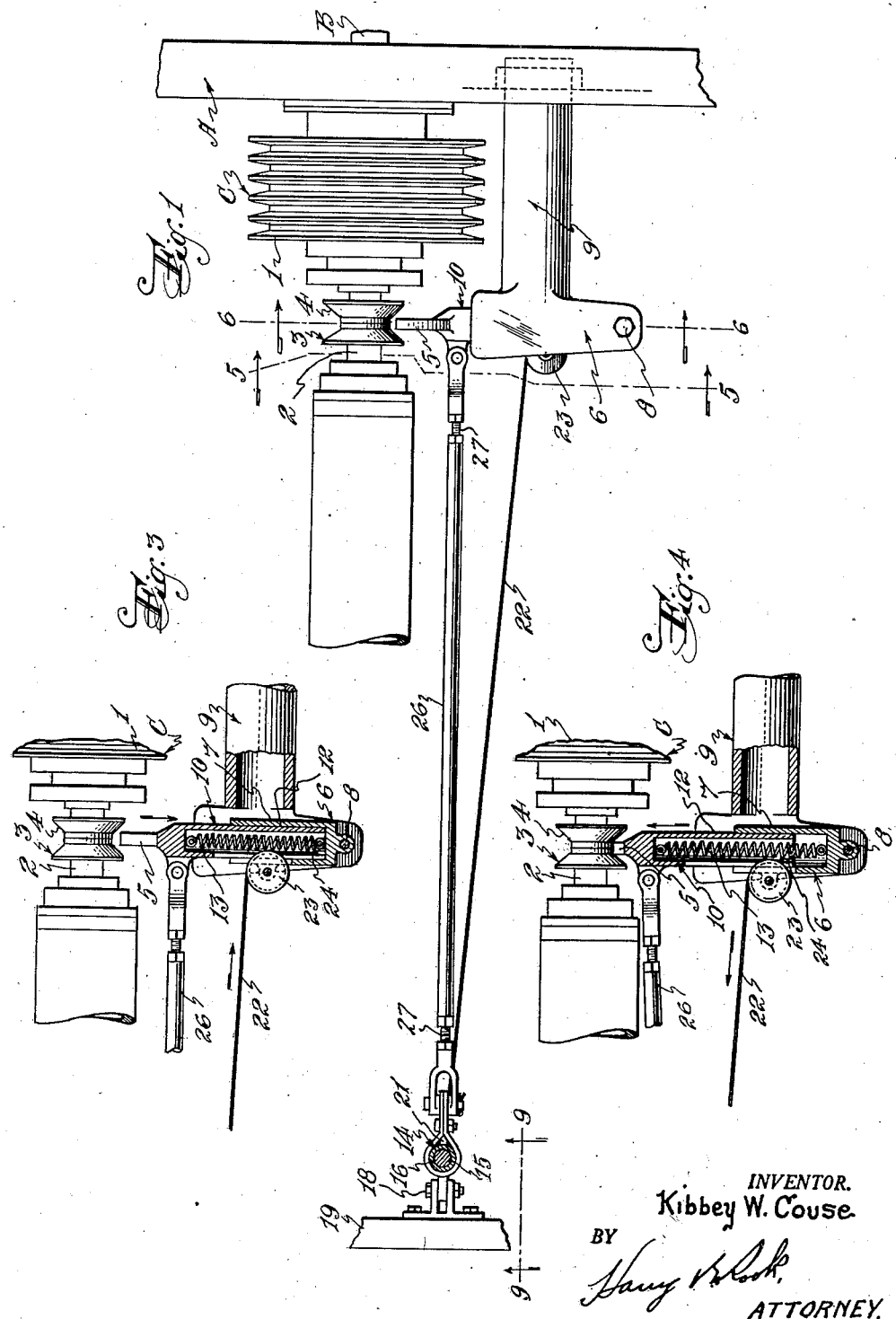

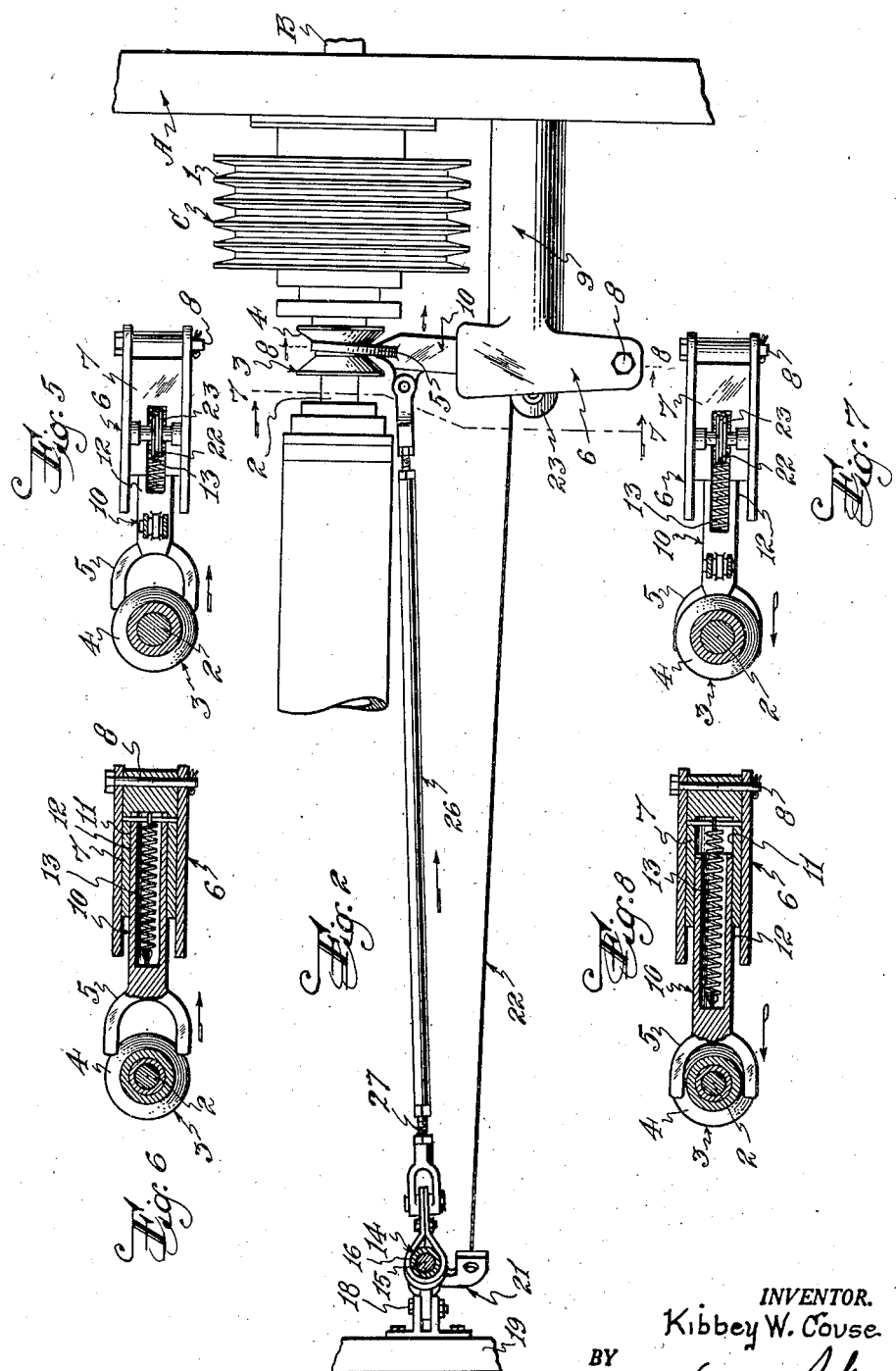

2,434,791

UNITED STATES PATENT OFFICE 2,434,791

SHIFTING MECHANISM FOR POWER TRANSMISSION APPARATUS

Kibbey W. Couse, Newark, N. J.

Application February 26, 1946, Serial No. 650,208

2 Claims. (Cl. 74—491)

1

This invention relates in general to a shifting mechanism for use in power transmission apparatus, such as for shifting clutches in power transmission shafts, or for shifting the elements of power take-off mechanisms and the like.

Shifting mechanism of this general character usually includes a forked lever which cooperates with a grooved collar on the power transmitting shaft so that swinging of the lever moves said collar longitudinally of the shaft to actuate one of the power transmitting elements, such as a clutch disc or the like; and in many cases it is desirable, if not necessary, to maintain the forked operating lever out of contact with the grooved collar during operation of the power transmission apparatus, both to prevent vibration and the incident rattling, as well as to reduce wear of parts.

Therefore one object of the invention is to provide a shifting mechanism of the general character described which shall include novel and improved features of construction whereby the actuating lever for the grooved collar or the like of the power transmission apparatus shall be normally distantly spaced from said grooved collar, but shall be easily and quickly moved into engagement with the collar and swung to actuate the collar in either of opposite directions.

Another object is to provide such a shifting mechanism which shall include a novel and improved construction and combination of an actuating lever and a hand lever for operating the actuating lever whereby successive rotary and swinging movements of the hand lever shall be operative to move the actuating lever into engagement with said collar and to swing said actuating lever for moving said collar in either of opposite directions respectively.

Other objects, advantages and results of the invention will be brought out by the following description in conjunction with the accompanying drawings in which:

Figure 1 is a top plan view of the shifting mechanism embodying the invention, illustrating it in conjunction with a known type of power transmission apparatus, the hand lever being broken away and shown in section, and the actuating lever being illustrated in normal or neutral position.

Figure 2 is a similar view showing the parts of the mechanism in the position assumed during movement of the collar in one direction.

Figure 3 is a fragmentary plan view of the actuating lever and its mounting, with the parts in the position shown in Figure 1 and with portions broken away and shown in sections.

2

Figure 4 is a view similar to Figure 3, showing the parts in the positions illustrated in Figure 2.

Figure 5 is a transverse vertical sectional view on the line 5—5 of Figure 1.

Figure 6 is a similar view on the line 6—6 of Figure 1.

Figure 7 is a view similar to Figure 5 taken on the line 7—7 of Figure 2.

Figure 8 is a view similar to Figure 6, taken on the line 8—8 of Figure 2.

Figure 9 is a side elevational view of the hand lever and its mounting, viewing it from substantially the plane of the line 9—9 of Figure 1, showing the lever in its neutral position.

Figure 10 is a similar view showing the rotation of the lever for projecting the forked actuating lever into engagement with the shifting collar of the power transmission apparatus.

Figure 11 is a horizontal sectional view on the line 11—11 of Figure 9.

Figure 12 is a similar view on the line 12—12 of Figure 10, and

Figure 13 is a view similar to Figure 9 showing the hand lever in the position corresponding to Figure 2.

Specifically describing the illustrated embodiment of the invention, the reference character A designates a frame or support, for example a portion of the chassis of a motor truck, in which is journaled a drive shaft B which is connected to a power take-off mechanism C of known type, for example like that shown in my U. S. Letters Patent No. 2,333,469, dated November 2, 1943, and within which is a clutch for selectively connecting the drive shaft B to a belt drum 1 or to a driven shaft 2 that is in end-to-end spaced relation to the drive shaft B.

The clutch includes a shifting collar 3 which has a circumferential V-shaped groove 4 in its periphery to cooperate with the forked or bifurcated end 5 of an actuating lever that includes a section 7 that is pivotally mounted at 8 on a bracket 9 secured to the frame A. The section 7 has slidably connected thereto in any suitable manner a second section 10, but as shown, the section 7 has a polygonal socket 11 in which a polygonal shank 12 of the section 10 is slidable. The section 10 carries the forked end 5, and a tension spring 13 is connected between the sections 7 and 10 so as to normally draw the latter into the former and to hold the forked end 5 in freely spaced relation to the shifting collar 3 as shown in Figures 1 and 6. The section 10 is movable outwardly from the section 7 so as to bring the forked end 5 into embracing relation to the shifting collar 3 within the grooves 4 thereof, as shown in Figures 2 and 8, so that the collar may be slid longitudinally, upon swinging of the actuating lever 6, to operate the clutch.

For so projecting the section 10 of the actuating lever into operative relation to the clutch collar, and for swinging the actuating lever 6 to move the clutch collar longitudinally, I have shown a hand lever 14 which includes a shaft section 15 that is mounted to rotate about its axis in a bearing sleeve 16 that is clamped in a collar 17 which, in turn, is pivotally mounted at 18 on a fixed support such as a bar 19 of the frame A, whereby the lever may swing in its own plane about the pivot 18 and may rotate about the axis of the shaft 15. To hold the shaft against longitudinal movement through the bearing sleeve 16, the shaft has a collar 20 to abut one end of the bearing, and an arm 21 to abut the other end of the bearing and which serves another purpose to be hereinafter described.

As shown, the arm 21 is connected to one end of a cable 22 which passes around an idler pulley 23 mounted on the section 7 of the actuating lever 6. The other end of said cable is connected fast at 24 to the sliding section 10 of the actuating lever. This section 10 is normally drawn by the spring 13 into the section 7 as shown in Figure 6, and the arm 21 is pulled by the spring 13 into the position shown in Figures 9 and 11, so that upon rotation of the shaft 15 of the hand lever and the arm 21 into the position shown in Figure 2, the forked section 10 of the actuating lever will be projected into operative relation to the clutch collar 3 as shown in Figure 4, so as to be ready for swinging of the actuating lever in either direction and consequent longitudinal movement of the clutch collar. For convenience in rotating the shaft section 15 of the hand lever, the free end of the shaft may have a hand wheel or knob 25.

In order to swing the actuating lever to move the clutch collar longitudinally, the hand lever 14 is connected by a link 26 to the forked section 10 of the actuating lever, and as shown the link 26 includes suitable adjusting means 27 for varying the length of the link to compensate for variance in the throw of the hand lever.

With the forked section 10 of the actuating lever projected into operative relation to the clutch collar 3, as shown in Figures 4 and 8, swinging of the hand lever about the pivot 18 in either direction will move the clutch collar in one direction or the other and, as shown in Figures 2 and 13, the hand lever has been swung to the right so as to move the clutch collar to the right as shown in Figures 2, 7 and 8.

Obviously, upon swinging of the hand lever in the opposite direction, the clutch collar 3 will be moved in the opposite direction or to the left as shown in Figures 1 or 2.

In the neutral position, as well as in both operative positions of the shifting collar, the forked end 5 of the actuating lever will be moved out of contact with said collar, it being understood that suitable means, such as shown in my copending application, Serial No. 643,570, filed January 26, 1946, may be utilized to releasably lock the shifting collar in its operative positions.

While I have shown the shifting collar as a part of a clutch or power take-off apparatus, the invention may be utilized in conjunction with other shiftable elements of other types of apparatus or machines, for example, speed-change gearing, all within the spirit and scope of the invention; and also the scope of the invention is such as to include many changes in details of construction of the shifting mechanism.

What I claim is:

1. Shifting mechanism of the character described including a longitudinally shiftable element, a shifting member normally in spaced inoperative relation to said shiftable element, and means for moving said shifting member into operative relation to said shiftable element and for longitudinally actuating the latter in succession, said means including an actuating lever having two sections movable relatively and together, one of which is pivotally connected to a fixed support while the other is formed to operatively engage said shiftable element, means for normally yieldingly pulling the second-named section away from said shiftable element, an operating lever mounted to revolve about a longitudinal axis and to swing about a transverse axis, an operative connection between said lever and the second-named section of said actuating lever to move the latter toward said shiftable element upon rotation of said operating lever, and an operative connection between said operating lever and the first-named section of the actuating lever for swinging the actuating lever to move said shiftable element longitudinally.

2. Shifting mechanism of the character described including a longitudinally shiftable element, a shifting member normally in spaced inoperative relation to said shiftable element, and means for moving said shifting member into operative relation to said shiftable element and for longitudinally actuating the latter in succession, said means including an actuating lever having two sections movable relatively and together, one of which is pivotally connected to a fixed support while the other is formed to operatively engage said shiftable element, means for normally yieldingly pulling the second-named section away from said shiftable element, an operating lever mounted to revolve about a longitudinal axis and to swing about a transverse axis, a lateral arm on said lever, a flexible connection between said arm and the second-named section of said actuating lever to move said section into operative relation to said shiftable element upon rotation of said lever about its longitudinal axis, and a link connecting said operating lever to the first-named section of said actuating lever for swinging the actuating lever to move said shiftable element longitudinally.

KIBBEY W. COUSE.

REFERENCES CITED

The following references are of record in the file of this patent:

UNITED STATES PATENTS

| Number | Name | Date |
|---|---|---|
| 1,947,988 | Hedgeland | Feb. 20, 1934 |
| 1,996,319 | Blair | Apr. 2, 1935 |
| 2,154,513 | Kuntz | Apr. 18, 1939 |